United States Patent [19]
Hayashi

[11] Patent Number: 6,108,505
[45] Date of Patent: Aug. 22, 2000

[54] TENSION MECHANISM FOR CARRIER DRIVING WIRE IN AN IMAGE PROCESSOR

[75] Inventor: Eiichi Hayashi, Ohmiya, Japan

[73] Assignee: Fuji Photo Optical Co., Ltd., Japan

[21] Appl. No.: 09/271,598

[22] Filed: Mar. 17, 1999

[30] Foreign Application Priority Data

Mar. 19, 1998 [JP] Japan .................................. 10-090813

[51] Int. Cl.$^7$ ................................................. G03G 15/00
[52] U.S. Cl. .......................................... 399/206; 74/89.22
[58] Field of Search ...................................... 399/206, 210, 399/211; 358/474, 497; 74/89.2, 89.22

[56] References Cited

U.S. PATENT DOCUMENTS

| | | | |
|---|---|---|---|
| 4,332,460 | 6/1982 | Gostanza ................................... | 399/210 |
| 4,372,671 | 2/1983 | Berdinner ................................. | 399/210 |
| 4,484,485 | 11/1984 | Matsuhisa ............................... | 74/89.22 |
| 4,771,315 | 9/1988 | Satomi ..................................... | 358/497 |
| 5,760,924 | 6/1998 | Takahara et al. ....................... | 358/474 |

*Primary Examiner*—Fred L Braun
*Attorney, Agent, or Firm*—Price, Heneveld, Cooper, DeWitt & Litton

[57] ABSTRACT

A tension mechanism for a carrier driving wire in an image processor in which a tension spring used to put the carrier driving wire under a tension is position regulated so that the tension spring is prevented from being stretched due to a vibration inevitably caused, for example, during transport of the image processor, and thereby the wire is reliably maintained in engagement with the guide pulleys. The housing of the image processor is provided with a spring stopper slidably moved longitudinally of a tension spring. The spring stopper has a pin adapted to be loosely inserted into an oval-shaped hook in one end of the tension spring adjacent an end of the wire.

20 Claims, 5 Drawing Sheets

TENSION MECHANISM FOR CARRIER DRIVING WIRE IN AN IMAGE PROCESSOR

BACKGROUND OF THE INVENTION

This invention relates to a tension mechanism to place a predetermined length of wire used to drive original scanning carriers under an appropriate tension in various image processors such as copying machines, printers and scanners. These image processors read images of an original represented on a paper sheet or the like and then subject these images to various kinds of processing.

The function of carriers in an image processor is to pick up images to be processed from the original and to guide them to an image processing unit such as a CCD. To achieve this, the carrier is provided with a reflector or the like adapted to form an optical path extending from the original to said CCD. The carrier thus scans the original and picks up the images on said original. The carrier is operatively associated with a wire taken up on a pulley by a motor so that said scanning is performed as said wire travels. One end of the wire is attached to the inner wall of the housing containing said carrier. The other end of the wire is also attached to the inner wall of the housing but with the interposition of a tension spring, for example, in the form of a tension coil spring so that the tension spring places the wire under a tension required for properly driving the carrier. An intermediate length of the wire is draped directly on the carrier or draped around a pulley rotatably supported by said carrier.

Such a conventional arrangement, in which the wire is attached to the housing of the image processor with the interposition of the coil spring or the like, may be accompanied with an apprehension that an external force such as vibration or shock caused, for example, during transport of the image processor might unintentionally move the carrier so as to pull the wire and thereby stretch said coil spring. Stretching of the coil spring may cause the wire to slacken and to slip from the guide pulleys. Various factors, such as the level of wire tension, are usually adjusted, for example, before shipping of the image processor so that the carrier may be driven in a predetermined manner after the image processor has been installed on its actual site of service. However, should the wire slip from the guide pulleys during transport of the image processor, said factors of the wire including its tension and, therefore, the manner in which the carrier is driven must be readjusted on the actual site of service. Operation of such readjustment is very troublesome and accordingly there is a serious need for an effective improvement to avoid the wire from slipping from the guide pulleys, for example, during transport of the image processor.

SUMMARY OF THE INVENTION

In view of the problem described above, it is a principal object of the invention to provide a tension mechanism for a carrier driving wire in an image processor which prevents the carrier driving wire from slipping from the guide pulleys during transport of the image processor.

The object set forth above is achieved according to the invention by a tension mechanism for a carrier driving wire in an image processor including said carrier for scanning an original placed on a support and adapted to drive said carrier in operative association with said wire, said tension mechanism for the carrier driving wire comprising a tension spring having one end linked to one end of said wire and the other end attached to a housing of said image processor and a position-regulating means adapted to position-regulate the end of said tension spring linked to the end of said wire.

The tension spring serving to place the wire under a desired tension has one end regulated by said position-regulating means adapted to retain said one end at a predetermined position even if an external force tends to stretch or compress said tension spring with respect to a predetermined length thereof. The tension spring is thus reliably prevented from being stretched or compressed and, in consequence, the wire cannot slacken and slip from the guide pulleys.

The function of the position-regulating means is to regulate said tension spring so as to put the wire under an appropriate tension and the presence of said position-regulating means does not interfere with the operation of the image processor during actual use thereof. Thus, the image processor is equipped with said position-regulating means not only during transport but also during actual use of the image processor. Preferably, the placement of said position-regulating means is adjustable.

Both said carrier driving wire and said tension spring cannot be free from certain dimensional errors occurring during production and those having their dimensional errors less than the tolerances are accepted. The dimensional errors of the products can be absorbed by adjusting the placement of the position-regulating means. More specifically, the placement of the position-regulating means is adjusted so that the tension spring may be set at a position enabling the wire to be put under a desired tension. In this way, it is possible to maintain the wire under a desired tension regardless of the dimensional errors of the wire and the tension spring having occurred during production.

Preferably, said tension spring is provided in the form of a tension coil spring having, at its end linked to said wire, an oval-shaped hook so that said position regulating member of said position-regulating means may be loosely inserted into said oval-shaped hook to regulate the placement of said end of said tension coil spring.

When an external force tends to stretch or compress the tension coil spring, said position regulating member comes into engagement with the end of the tension coil spring so as to prevent said tension coil spring from being further stretched or compressed. Accordingly, even if an external force due to vibration caused, for example, during transport of the image processor is exerted upon said tension coil spring, the wire will not slacken and, therefore, will not slip from the guide pulleys.

Preferably, said position regulating member is loosely inserted into said oval-shaped hook in a vertical or a horizontal direction.

The arrangement in which said position regulating member is loosely inserted into said oval-shaped hook in a vertical direction stabilizes the tension spring against vibration in a horizontal direction, and the arrangement in which said position regulating member is loosely inserted into said oval-shaped hook in a horizontal direction stabilizes said tension spring against vibration in a vertical direction.

DETAILED DESCRIPTION OF THE PREFERRED EMBODIMENTS

Details of the inventive tension mechanism for the carrier driving wire in the image processor will be more fully understood from the description of the preferred embodiments given hereunder with reference to the accompanying drawings.

Figure 6:
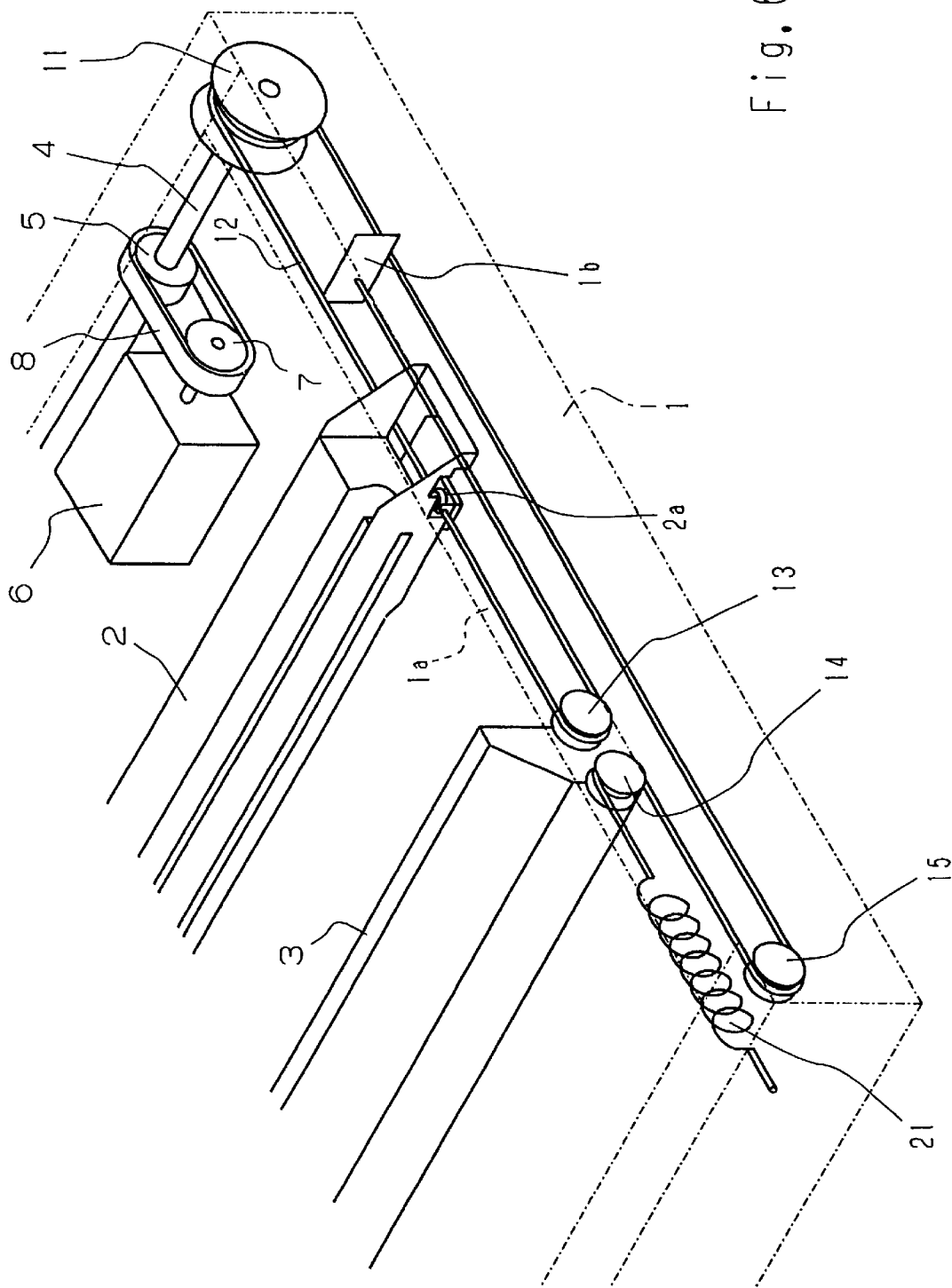
FIG. 6 is a schematic perspective view illustrating the carrier driving mechanism utilizing the carrier driving wire adapted to be tensioned by the tension mechanism according to the invention.

A carrier driving mechanism will be briefly described first with reference to FIG. 6. A housing 1 for the image processor is formed with a pair of guides 1a defined by steps extending inwardly from respective inner surfaces of transversely opposite side walls of said housing 1. These guides 1a extend longitudinally of said housing 1 so that a first carrier 2 and a second carrier 3 placed on said guides 1a may be slidably moved thereon. These carriers 2, 3 are provided with reflectors (not shown) in an appropriate manner so as to define an optical path serving to direct an image on an original (not shown) placed upon a top surface of the housing 1 towards a pick-up element such as a CCD (not shown). The image is read from the original as these carriers 2, 3 slidably move along the original to scan it. During this movement for scanning, a predetermined relationship must be maintained between the first and second carriers 2, 3 so that the length of the optical path can be maintained constant.

A driving shaft 4 having its axis orthogonal to the scanning direction of the carriers 2, 3 is rotatably supported at longitudinally opposite ends of the housing 1. Shaft 4 is provided at its longitudinal middle with a driven pulley 5 fixed thereon. A loop of driving belt 8 extends over said driven pulley 5 and on a driving pulley 7 fixed to an output shaft of an electric motor 6. This driving shaft 4 carries on its longitudinally opposite ends take-up pulleys 11 adapted to be rotated together with said driving shaft 4. An intermediate length of wire 12 is wound on each of said take-up pulleys 11 by an appropriate number of turns. A pair of guide pulleys 13, 14 are arranged side by side in the scanning direction are supported on each of the longitudinally opposite end surfaces of the second carrier 3 so that the guide pulleys 13, 14 can be rotated around their axes which are orthogonal to said scanning direction. At an end of the housing 1 opposite to said end rotatably supporting said driving shaft 4, guide pulleys 15 are supported by said housing 1 to be rotated around their axes also orthogonal to said scanning direction. The respective side walls of the housing 1 are provided at appropriate locations with brackets 1b. It should be understood that the respective pairs of take-up pulleys 11, wires 12, guide pulleys 13, 14, 15 and brackets 1b are arranged within the housing 1 so as to be mutually opposed with a scanning zone of the carriers 2, 3 located therebetween.

One end of the wire 12 having its intermediate length wound around one of the take-up pulleys 11 goes by way of means 2a operatively associated with the first carrier 2, then one of said guide pulleys 13, and is anchored on one of said brackets 1b. The other end of the wire 12 successively goes by way of respective guide pulleys 15, 14 and is anchored on one of the longitudinally opposite end walls of the housing 1 by the tension control of the present invention including a tension spring 21, for example, in the form of a tension coil spring.

Figure 1:
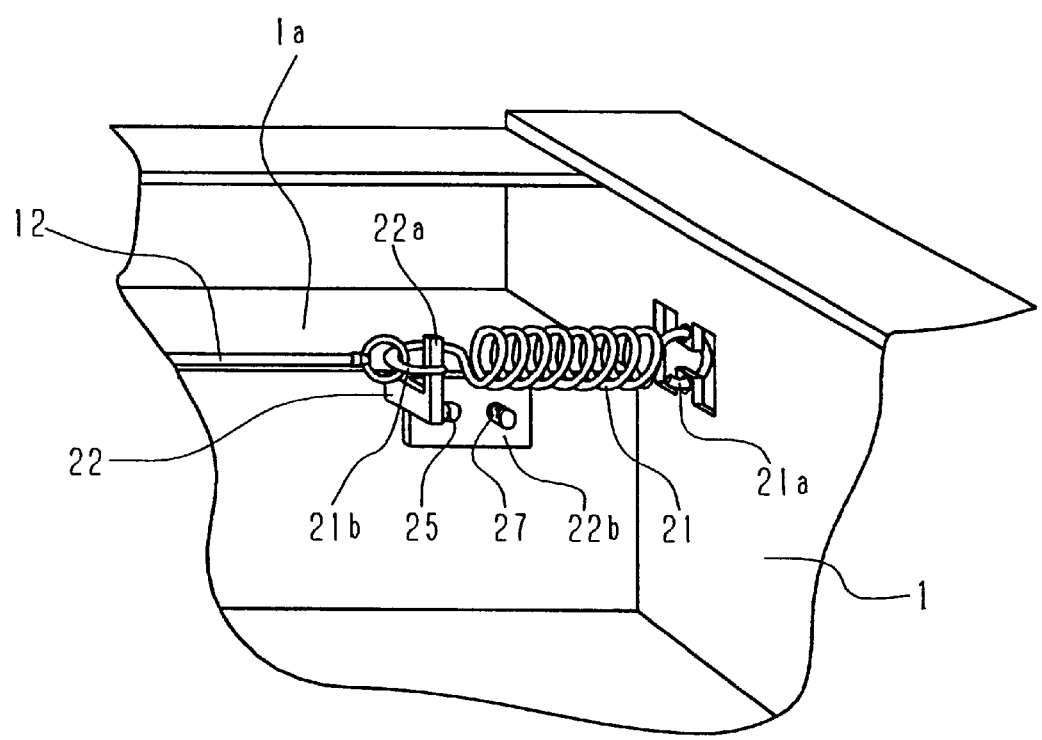
FIG. 1 is a fragmentary perspective view showing an embodiment of the inventive tension mechanism for a carrier driving wire in an image processor.

FIG. 1 is a perspective view showing said tension spring 21 linked to the wire 12. As shown, the tension spring 21 is formed at its longitudinally opposite ends with hook-like ends 21a, 21b, the former being attached to the wall of the housing 1 at an appropriate location thereof and the latter being attached to the adjacent end of the wire 12. The recoil strength of tension spring 21 generates a tensile strength in the wire 12 so as to maintain the wire 12 under an appropriate tension. The hook-like end 21b of said tension spring 21 lying adjacent the wire 12 is adapted for loosely receiving a pin 22a of a spring stopper 22 serving as position-regulating means. Said pin 22a directly functions as a position regulating member.

Figure 4:
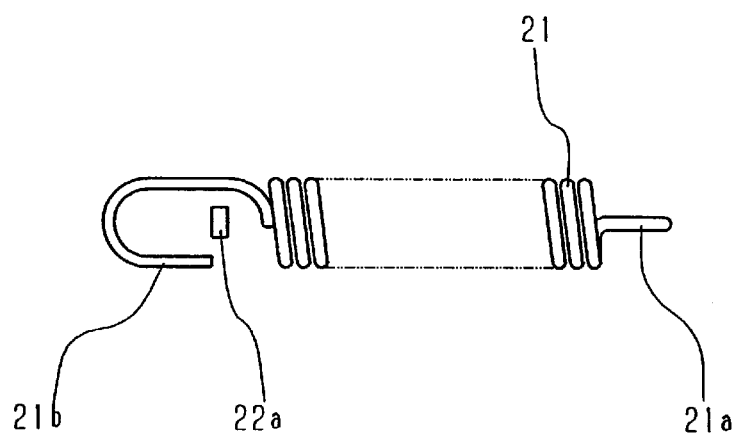
FIG. 4 is a front view showing a tension spring serving as a component of said tension mechanism.

FIG. 4 is a front view of said tension spring 21. The hook-like end 21a lying adjacent the housing 1 may be of any shape so far as said end 21a can be easily and reliably attached to the housing 1 and is substantially circular-arc-shaped (FIG. 1). The hook-like end 21b lying adjacent the wire 12, on the other hand, is shown herein to be substantially oval-shaped. Said pin 22a of the spring stopper 22 is also shown in FIG. 4, showing its relationship to end 21b of spring 21.

Figure 3:
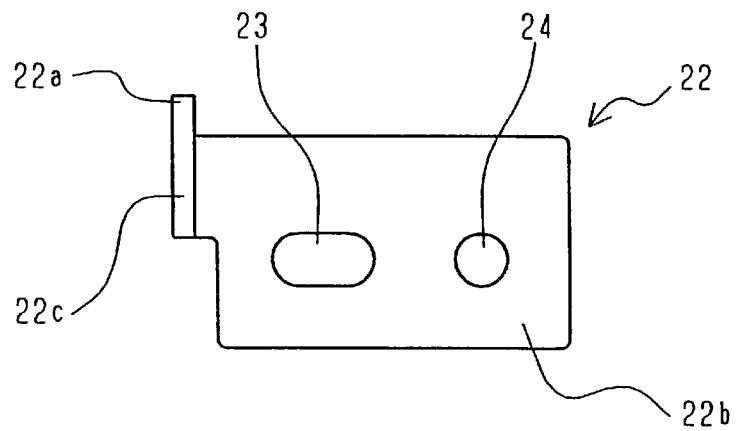
FIG. 3 is a front view showing said position-regulating means.

As will be apparent from FIGS. 1 and 3, the spring stopper 22 comprises a base 22b destined to be fastened to the housing 1, an arm 22c formed by bending an end of said base 22b, and said pin or pin 22a extending upward from a distal end of said arm 22c. The base 22b is formed with a guide slot 23 of which the longitudinal axis will extend in parallel to the longitudinal axis of the tension spring 21 when the latter is linked to the wire 12. The base 22b is further provided with a threaded aperture 24 so as to lie on the longitudinal axis of said guide slit 23.

Figure 2:
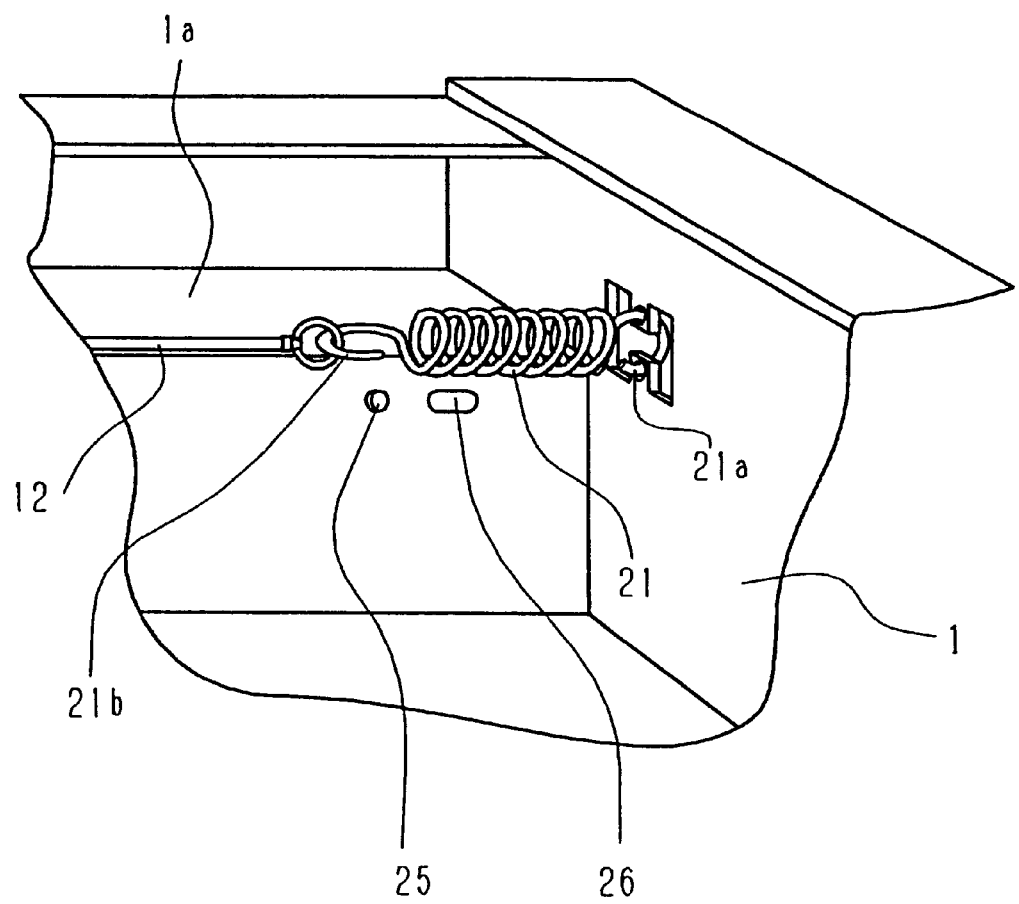
FIG. 2 is a view similar to FIG. 1 showing said tension mechanism with position regulating means removed therefrom.

Referring now to FIG. 2, the housing 1 is additionally provided in a region of its wall facing the tension spring 21 spanned between said housing 1 and the wire 12 with a guide pin 25 adapted to be loosely received by said guide slot 23, a slot 26 having a longitudinal axis extending in parallel to the longitudinal axis of the tension spring 21 and a size sufficient to receive a set screw 27 which is adapted, in turn, to be threaded into said aperture 24.

The specific embodiment of the inventive tension mechanism for the carrier driving wire constructed as described above operates in a manner as will be described.

The wire 12 is extended under an appropriate tension in operative association with the respective carriers 2, 3 and the one end thereof is attached to the hook 21b of the tension spring 21 which has the other hook 21a attached to the housing 1, as shown in FIG. 6. In this state, the recoil strength of said tension spring 21 acts on the wire 12 so that an appropriate tensile strength maintains the wire 12 tight.

Then, the spring stopper 22 is fixed to the housing 1 so that the pin 22a of said spring stopper 22 extends through and is loosely received by the hook 21b of the tension spring 21. At the same time, the guide pin 25 projecting from the inner wall of the housing 1 is loosely inserted into the slit 23 of the spring stopper 22 and said aperture 24 is aligned with the slit 26 of the housing 1. Thereafter, the set screw 27 having been inserted into said slit 26 from the outside of the housing 1 is threaded into said aperture 24 until said set screw 27 is fully threaded into said base 22b. Before the set screw 27 is fully threaded into said aperture 24, the spring stopper 22 may be shifted longitudinally of the tension spring 21 to adjustably position the pin 22a of said spring stopper 22 slightly towards the tension spring 21 with respect to the middle of the hook 21b. Finally the set screw 27 is fully tightened and the spring stopper 22 is fixed in place.

As has been described above, the pin 22a of the spring stopper 22 has been loosely inserted into the hook 21b of the tension spring 21, which functions to maintain the wire 12 tight. Accordingly, the end of the tension spring 21 attached to the wire 12 is position—regulated by said pin 22a and, therefore, said tension spring 21 cannot be over stretched even when a vibration due to, for example, transport of the image processor on a vehicle or the like tends to stretch said tension spring 21. As a result, such position regulation structure prevents the wire 12 from slackening and slipping off the pulleys, for example, from said pulley 14.

Elongation of the wire 12 due to its fatigue is absorbed and compensated by contraction of the tension spring 21. Particularly, according to this specific embodiment, the elongation of the wire 12 can be adequately absorbed by contraction of the tension spring 21 because of the unique arrangement such that the hook 21b is of a substantially oval shape and the pin 22a is positioned slightly towards the tension spring 21.

Figure 5:
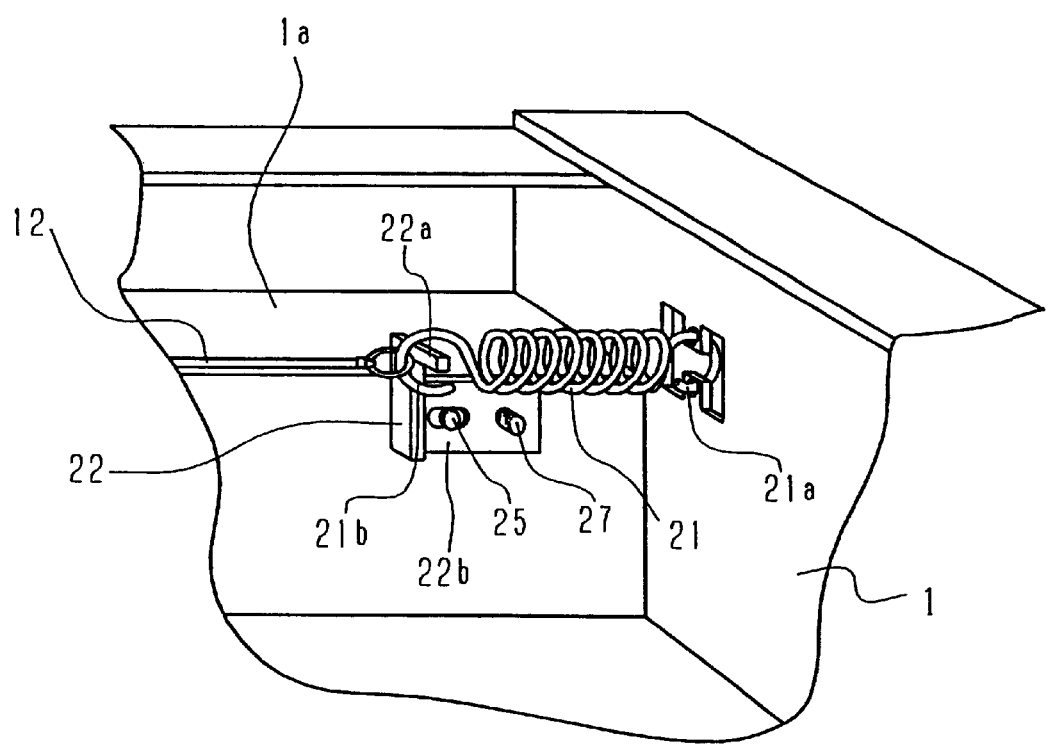
FIG. 5 is a view similar to FIG. 1 showing another embodiment of the inventive tension mechanism for the carrier driving wire in the image processor.

While a preferred embodiment of the invention has been described above, it will be apparent to those skilled in the art that the invention is not limited to this specific embodiment and various modifications are possible without departing from the scope and spirit of the invention. For example, FIG. 5 shows another embodiment according to which the pin 22a of said tension stopper 22 is inserted into the hook 21b in a direction different from the direction in which such insertion is performed by the embodiment shown in FIG. 1. More specifically, the pin 22a is horizontally inserted into the hook 21b in the case of FIG. 5, while such insertion is vertically performed in the case of FIG. 1. The vertical insertion is effective to reliably prevent the pin 22a from getting out of the hook 21b when the tension spring 21 vibrates in the horizontal direction while the horizontal insertion is effective to reliably prevent the pin 22a from getting out of the hook 21b when the tension spring 21 vibrates in the vertical direction. To assure that the pin 22a never gets out of the hook 21b in any case, i.e., no matter whether the tension spring 21 vibrates in the horizontal direction or in the vertical direction, an appropriate length of said pin 22a in the proximity of a distal end thereof may be previously bent to make a substantially right angle with the remainder length of said pin 22b.

As will be apparent from the foregoing description, the inventive tension mechanism for the carrier driving wire in the image processor adopts the position-regulating means serving to regulate the end of the tension spring. Said position-regulating means reliably prevents the tension spring not only from being stretched but also from being compressed with respect to the position which has been regulated by said position-regulating means. Consequently, there is no apprehension that a vibration possibly generated, for example, during transport of the image processor might cause the wire to slip from the pulleys. Furthermore, said image processor can be installed at a given location without any change in the state of the wire once it has been adjusted on the production line.

In addition, it is unnecessary to remove said position-regulating means before the image processor is actually used because the tension spring is normally free from any interference by the position-regulating means. Moreover, an appropriate position at which the position-regulating means interferes with the tension spring when the latter contracts may be preset so that said tension spring can contract by a given amount and thereby can absorb an elongation of the wire due to fatigue thereof.

Presetting the position at which the position-regulating means interferes with the tension spring also enables the wire to be optimally positioned with respect to said tension spring linked to the wire. In this way, dimensional tolerances of the wire as well as the tension spring caused during their manufacturing processes can be effectively compensated.

The tension spring is operatively associated with the position-regulating means by the oval-shaped hook formed at the end of said tension spring so that the position regulating member in the form of a pin of said position-regulating means may shift within said oval-shaped hook to compensate an elongation of the wire due to its fatigue and thereby to maintain the tensile strength of the wire constant.

These and other modifications to the preferred embodiment of the invention as described herein can be made without departing from the spirit or scope of the invention as defined by the appended claims.

What is claimed:

1. A tension mechanism for a carrier driving wire in an image processor having a housing including a carrier for scanning of an original placed on a support and adapted to drive said carrier in operative association with said wire, said tension mechanism for the carrier driving wire comprising:

a tension spring having one end coupled to one end of said wire and the other end coupled to a housing of said image processor; and position-regulating means associated with said spring to position-regulate the end of said tension spring coupled to the end of said wire.

2. A tension mechanism for the carrier driving wire in the image processor according to claim 1, wherein the position of said position-regulating means is adjustable.

3. A tension mechanism for the carrier driving wire in the image processor according to claim 1 or 2, wherein said tension spring is provided in the form of a tension coil spring having an oval-shaped hook so that a position-regulating member of said position-regulating means may be loosely inserted into said oval-shaped hook to regulate the position of said end of said tension coil spring.

4. A tension mechanism for the carrier driving wire in the image processor according to claim 3, wherein said position regulating member is loosely inserted into said oval-shaped hook in a vertical direction.

5. A tension mechanism for the carrier driving wire in the image processor according to claim 3, wherein said position regulating member is loosely inserted into said oval-shaped hook in a horizontal direction.

6. A position regulator for a carrier driving wire in an image processor comprising:

a housing;

a carrier movably mounted to said housing for scanning an original;

a carrier driving wire coupled to said carrier;

a tension spring with one end having a hook coupled to an end of said wire and the other end coupled to said housing for placing said wire under tension; and a pin extending from said housing, through said hook to position-regulate said one end of said tension spring.

7. The position regulator as defined in claim 6 wherein said pin is adjustably mounted to said housing.

8. The position regulator as defined in claim 7 wherein said hook is oval-shaped so that said pin may be loosely inserted into said oval-shaped hook to regulate said one end of said tension spring.

9. The position regulator as defined in claim 8 wherein said pin is loosely inserted into said oval-shaped hook in a vertical direction.

10. The position regulator as defined in claim 8 for the carrier driving wire in the image processor wherein said pin is loosely inserted into said oval-shaped hook in a horizontal direction.

11. A position regulator for a carrier driving wire in an image processor comprising:
   a housing for an image processor;
   a carrier movably mounted to said housing;
   a carrier driving wire having one end coupled to said carrier;
   a tension spring with one end with a hook coupled to an end of said wire remote from said one end of said wire and an opposite end coupled to said housing; and
   a bracket mounted to said housing, said bracket including a pin extending through said hook to limit the motion of said one end of said spring thereby maintaining tension on said wire during the shipment of the image processor.

12. The position regulator as defined in claim 11 wherein said bracket is adjustably mounted to said housing.

13. The position regulator as defined in claim 12 wherein said housing includes a guide pin extending therefrom and said bracket includes an elongated slot for receiving said guide pin.

14. The position regulator as defined in claim 13 wherein said elongated slot has an axis aligned with said direction of said wire.

15. The position regulator as defined in claim 14 and further including a threaded fastener extending between said housing and said bracket for locking said bracket in a fixed position with respect to said housing.

16. The position regulator as defined in claim 15 where in said housing includes a housing elongated slot adjacent said guide pin and said bracket includes a threaded aperture adjacent said elongated slot of said bracket for receiving said threaded fastener.

17. The position regulator as defined in claim 16 wherein said threaded fastener extends first through said housing elongated slot and then into said threaded aperture.

18. The position regulator as defined in claim 17 wherein said hook is oval-shaped so that said pin may be loosely inserted into said oval-shaped hook to regulate said one end of said tension spring.

19. The position regulator as defined in claim 18 wherein said pin is loosely inserted into said oval-shaped hook in a vertical direction.

20. The position regulator as defined in claim 18 for the carrier driving wire in the image processor wherein said pin is loosely inserted into said oval-shaped hook in a horizontal direction.

\* \* \* \* \*